United States Patent [19]

Rinaldi et al.

[11] 3,899,357

[45] Aug. 12, 1975

[54] ELECTRODES INCLUDING MIXED TRANSITION METAL OXIDES

[75] Inventors: Rose V. Rinaldi, West Long Branch; James E. Wynn, Neptune, both of N.J.

[73] Assignee: The United States of America as represented by the Secretary of the Army, Washington, D.C.

[22] Filed: July 16, 1973

[21] Appl. No.: 379,885

Related U.S. Application Data

[62] Division of Ser. No. 114,711, Feb. 11, 1971, abandoned.

[52] U.S. Cl. ......... 136/121; 136/120 FC; 136/86 A
[51] Int. Cl.² ........................................ H01M 13/02
[58] Field of Search............ 136/121, 120 FC, 86 A; 252/466 J, 473; 423/594, 600

[56] References Cited
UNITED STATES PATENTS
2,370,443   2/1945   Biefeld............................ 423/600 X FOREIGN PATENTS OR APPLICATIONS
1,028,766   5/1966   United Kingdom........... 136/120 FC

*Primary Examiner*—Dewayne Rutledge
*Assistant Examiner*—M. J. Andrews
*Attorney, Agent, or Firm*—Nathan Edelberg; Robert P. Gibson; Roy E. Gordon

[57] ABSTRACT

Mixed transition metal oxides are made by a partial reduction of stoichiometric mixtures of the required salts based on the proportion of the metal ion in the oxide being prepared and a firing of the partially reduced mixtures at 800 degrees C. in a carbon monoxide rich atmosphere. The mixed transition metal oxides are used as catalysts in air oxygen cathode structures in practical battery applications.

This invention relates to mixed transition metal oxides, to their method of manufacture, and to the use of the oxides as catalysts in air oxygen cathode structures in practical battery applications.

1 Claim, No Drawings

ELECTRODES INCLUDING MIXED TRANSITION METAL OXIDES

BACKGROUND OF THE INVENTION

This is a division of application Ser. No. 114,711, filed Feb. 11, 1971, now abandoned.

Present air-breathing batteries use platinum catalysts for air (oxygen) reduction. The difficulty with such systems is the high cost of platinum which makes its extensive use in such systems prohibitive.

SUMMARY OF THE INVENTION

The general object of this invention is to provide low cost materials capable of improving oxygen reduction reactions in air-breathing power sources. A further object of this invention is to provide a method of making the low cost materials. A more specific object of the invention is to provide low cost catalysts for metal-air batteries and fuel cells.

We have now prepared certain transition metal oxides that can be used as catalysts to replace presently used platinum catalysts for the air-oxygen electrode in air-breathing power sources as for example, alkaline electrolyte fuel cells, mechanically rechargeable zinc-air batteries, and primary "disposable" zinc-air batteries. The catalytic materials are mixed oxides of metals like iron, copper, magnesium, cobalt, and aluminum which are inexpensive as compared to platinum and yet effectively produce electrical performance characteristics comparable to the platinum metal catalysts. The mixed transition metal oxides are made by a partial reduction of stoichiometric mixtures of the required salts based on the proportion of the metal ion in the oxide being prepared and a firing of the partially reduced mixtures at 800° C. in a carbon monoxide rich atmosphere.

Convenient starting materials in preparing the oxides are nitrate salts (hydrated) of copper, magnesium, cobalt, iron, and aluminum. The following two general equations represent the preparation of the oxide catalysts.

EQUATION I

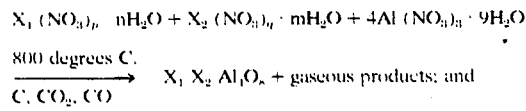

EQUATION II

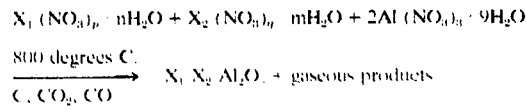

where $X_1$ above may be $Co^{+2}$, $Mg^{+2}$, $Cu^{+2}$, $Fe^{+2}$, or $Fe^{+3}$;

where $X_2$ above may be $Mg^{+2}$, $Cu^{+2}$, $Fe^{+2}$, or $Fe^{+3}$ when $X_1$ above is $Co^{+2}$;

where $X_2$ above may be $Co^{+2}$, $Mg^{+2}$, $Fe^{+2}$, or $Fe^{+3}$ when $X_1$ above is $Cu^{+2}$;

where $X_2$ above may be $Co^{+2}$, $Cu^{+2}$, $Fe^{+2}$, or $Fe^{+3}$ when $X_1$ above is $Mg^{+2}$;

where $X_2$ above may be $Co^{+2}$, $Mg^{+2}$, $Cu^{+2}$, or $Fe^{+3}$ when $X_1$ above is $Fe^{+2}$;

where $X_2$ above may be $Co^{+2}$, $Mg^{+2}$, $Cu^{+2}$, or $Fe^{+2}$ when $X_1$ above is $Fe^{+3}$;

where the $p$'s and $q$'s represent combining ratios, and the $n$'s and $m$'s represent numbers for the water of hydration.

The stoichiometric quantities of the salts required to prepare any particular oxide catalyst sample are computed on the basis of Equations (1) and (2) for the formation of one-gram samples or any multiples thereof. To form one-gram oxide catalyst samples according to Equations (1) and (2), the formulas are:

$$\frac{\text{Total grams salts}}{\text{gram catalyst}} = \frac{\text{Mol Wt } X_1 \text{ salt}}{\text{Mol Wt catalyst}} + \frac{\text{Mol Wt } X_2 \text{ salt}}{\text{Mol Wt catalyst}} + \frac{4 \text{ Mol Wt Al salt}}{\text{Mol Wt catalyst}}$$

$$\frac{\text{Total grams salts}}{\text{gram catalyst}} = \frac{\text{Mol Wt } X_1 \text{ salt}}{\text{Mol Wt catalyst}} + \frac{\text{Mol Wt } X_2 \text{ salt}}{\text{Mol Wt catalyst}} + \frac{2 \text{ Mol Wt Al salt}}{\text{Mol Wt catalyst}}$$

BRIEF DESCRIPTION OF THE PREFERRED EMBODIMENT

Stoichiometric quantities are weighed out of each nitrate salt required for 5.0 grams of the catalyst being prepared. The weighed samples are transferred to a porcelain evaporating dish and just enough distilled water added to completely dissolve the mixture of nitrate salts. Three to five grams of finely powdered graphite or carbon black are added to the solution to obtain partial reduction of the nitrates and to form a thick slurry. The excess water is then removed by evaporation from the partially reduced slurry on a steam bath followed by the use of a vacuum at about 25 inches of mercury at room temperature followed by heating in a vacuum to about 90° C. The partially reduced mixture is then fired in a high temperature oven through which carbon dioxide gas is passed at 800° C. and at a rate of about 1 liter per minute until all of the carbon or graphite has been burned off. The carbon or graphite serves a three-fold purpose: (1) partial reduction of the nitrates to the transition metals in which oxide compounds are to be formed, (2) aids in the formation of oxide catalyst particles of an extremely small and uniform size (below 325 mesh), and (3) aids in establishing the carbon monoxide rich atmosphere by the Boudouard equilibrium.

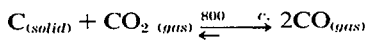

which is catalytic for formation of the oxide compounds.

The following Table shows several mixed oxides prepared by the above method.

TABLE

| CATALYST | COLOR | CATALYST | COLOR |
| --- | --- | --- | --- |
| $MgFeAl_4O_x$ | rusty orange | $CuCoAl_2O_5$ | black |
| $MgFeAl_2O_5$ | reddish brown | $MgCuAl_4O_x$ | brown |
| $MgCoAl_4O_x$ | blue | $MgCuAl_2O_5$ | dark grey |
| $MgCoAl_2O_5$ | dark green | $CoFeAl_4O_x$ | dark blue |
| $CuFeAl_4O_x$ | brown | $CoFeAl_2O_5$ | reddish brown |
| $CuFeAl_2O_5$ | dark red | | |
| $CuCoAl_4O_x$ | blue | | |

The transition metal oxides are found to be chemically stable in acid and basic solution; properties which are essential for a catalyst to be used in a battery electrode.

The mixed transition metal oxides are incorporated into electrodes by mixing 20 to 35 percent by weight of the oxide with conductive carbon or graphite and polytetrafluoroethylene emulsion. These wet mixes are spread onto expanded nickel mesh and followed with a pressing and sintering process. Platinum catalyzed electrodes are prepared in a similar fashion.

The electrochemical performances of the oxide catalyzed electrodes have produced initial single cell performances of 100 amperes per square foot at cell voltages of 1.00–1.08 volts using sheet zinc with a 5M KOH electrolyte. Platinum catalyzed electrodes produce the same current density at cell voltages of 1.10–1.15 volts. The key point is that even though the operating cell voltages of oxide catalyzed electrodes are slightly less than the platinum catalyzed ones, a one-hundred fold reduction in catalyst cost is realized with the oxides. Over 80 hours of intermittent life have been achieved with several oxide catalysts.

We wish it to be understood that we do not desire to be limited to the exact details described, for obvious modifications will occur to a person skilled in the art.

What is claimed is:

1. A battery electrode comprising an expanded nickel mesh coated with a mixture of 20 to 35 percent by weight of a mixed transition metal oxide selected from the group consisting of $MgCoAl_4O_x$, $CuFeAl_4O_x$, $CuCoAl_4O_x$, $MgCuAl_4O_x$, $CoFeAl_4O_x$ and $MgFeAl_4O_x$ with conductive carbon and polytetrafluoro ethylene.

* * * * *